May 19, 1925.
J. F. JOHNSTON ET AL
1,538,818
BATTERY BOX
Filed May 25, 1921
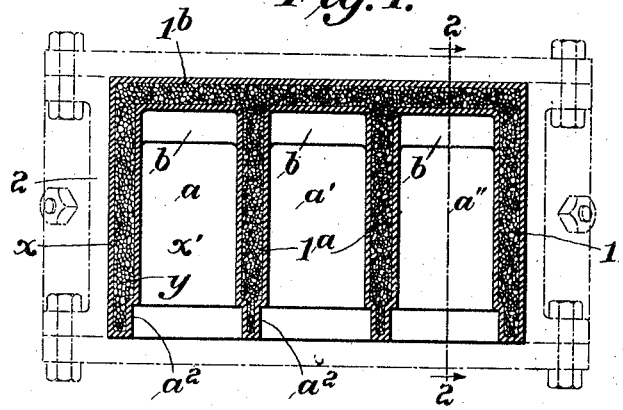
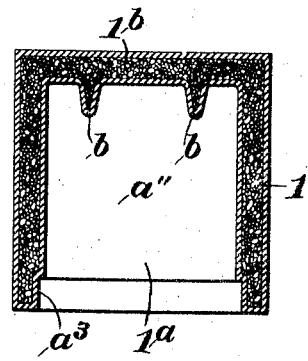
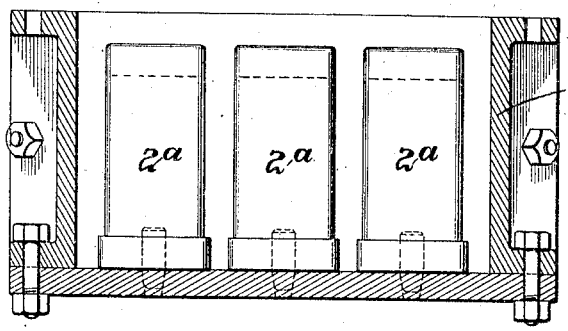
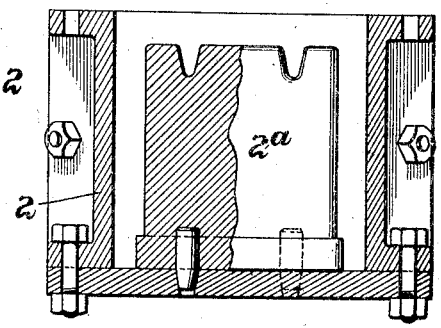
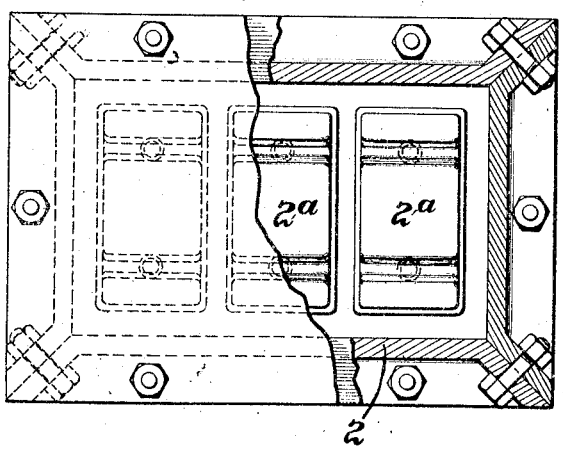
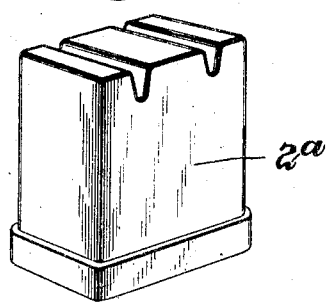
Inventors:
John F. Johnston,
George W. Bulley,
by Spear Middleton Donaldson & Hall
Attys.

Patented May 19, 1925.

1,538,818

UNITED STATES PATENT OFFICE.

JOHN F. JOHNSTON AND GEORGE W. BULLEY, OF AKRON, OHIO, ASSIGNORS TO THE MILLER RUBBER COMPANY, OF AKRON, OHIO, A CORPORATION OF OHIO.

BATTERY BOX.

Application filed May 25, 1921. Serial No. 472,427.

*To all whom it may concern:*

Be it known that we, JOHN F. JOHNSTON and GEORGE W. BULLEY, citizens of the United States, and residents of Akron, in the county of Summit and State of Ohio, have invented certain new and useful Improvements in Battery Boxes, of which the following is a specification.

Our present invention relates to improvements in rubber articles or containers and is designed more especially for storage battery cell construction, and is so described although not limited to such use, and comprises the novel article hereinafter described and particularly defined by the appended claims.

Heretofore, so far as we are aware, storage batteries as commercially constructed have comprised a plurality of separate or individual hard rubber cells set in a wooden box and surrounded by an asphaltum composition. Such assembled form is expensive and unreliable, but the construction of a unitary article has heretofore been found impracticable due to moulding difficulties.

The present invention aims to provide a unitary article which will be light in weight but strong and durable and which will be acid proof and an excellent heat insulator. We have discovered that by incorporating in a hard rubber vulcanizing compound a blowing agent capable of being volatilized by the vulcanizing heat, such hard rubber compound could be used for cell wall and bottom construction and when vulcanized would, while being hard and rigid, have a cellular formation which would make it extremely light and of excellent heat insulating quality. Various blowing agents may be used and when the blowing agent is water which is converted into steam by the vulcanizing heat, thereby producing the cells, the condensation of the steam after the cooling of the container causes the interior of the cell walls to be practically void, thereby making such walls a still better heat insulator.

Various modifications of the container structure and of the method of making the same have been discovered by us in the course of our investigations, as will hereinafter appear.

In order that our invention may be more easily understood, we will describe the same in connection with the accompanying drawings, in which:

Figure 1 is a longitudinal vertical section through the container with the forming mould box indicated in dotted lines.

Figure 2 is a section on line 2—2 of Figure 1.

Figure 3 is an enlarged sectional view of cell wall forming material.

Figure 4 is a longitudinal vertical section through the mould box with the cores in place.

Figure 5 is a transverse view through the same.

Figure 6 is a top plan view of the mould box, partly in section, and

Figure 7 is a perspective detail of one of the core members.

A container constructed in accordance with our invention is illustrated in inverted position at 1 in Figures 1 and 2. in which it is shown as a unitary battery cell having transverse partitions $1^a$ forming with the side and end walls a plurality of compartments or cells $a$, $a'$, $a''$, (three being shown as an example of any desired number). The bottom $1^b$ is provided with the customary cross bridges or ribs $b$ for supporting the usual plates (not shown) clear of the bottom, and the edges of the side and end walls and partitions are preferably rebated, as indicated at $a^2$ and $a^3$ to receive individual cover plates (not shown). The side and end walls and bottom are constructed of vulcanized hard rubber compound, one or more of the surfaces, preferably both, being of dense rubber, as indicated at $x$ and $x'$ and the intermediate portion being of cellular formation as indicated at $y$, the whole being integrally united.

According to one manner of carrying out our invention, we provide a metal mould 2 comprising side, end and bottom and top walls detachably connected together as shown, the bottom having core projections $2^a$ formed to give proper shape to the cell cavities, and such core parts being preferably detachably connected to the bottom member, whereby they are more easily handled. The projections are covered or wrapped with thin layers or sheets of hard ruber vulcanizing compound such as indicated at $x'$, and, if separated from the bottom member, are reattached thereto. The side and end walls of the mould are then secured together and to the bottom plate, and if the container is to have a smooth dense exterior, said side and end mould walls would also be covered with sheets or layers of hard rubber compound $x$.

The intervening space is then partially filled with the hard rubber compound $z$ having the blowing agent incorporated therein.

This may be put in sheet or slab form, as, owing to the expansion taking place in vulcanizing there will be ample room to permit the slab containing the blowing agent to be slid or inserted edgewise into place. The container bottom may then be applied in the same way, to wit, by inserting the bridge forming pieces in the core grooves, laying a sheet of rubber over the core ends and applying thereon the layer or slab containing the blowing agent, upon which may be applied an outer layer for forming a smooth outer surface. Thereafter the mould is closed and subjected to vulcanizing heat in any suitable manner. This vulcanizing heat volatilizes the blowing agent and expands the rubber producing therein a cellular structure, and causes the mould cavity to be completely filled and a complete integral unitary article produced having a rigid cellular formation occupying a greater or less portion of its wall space depending on the relative thickness and arrangement of the sheets.

As a modification of this process, layers of hard rubber compound with and without blowing agent respectively, could be assembled or superimposed to form a composite slab which could then be applied to the core members.

Another modification which we have found advantageous is to assemble the layers over a temporary form and thereafter transfer the same to the mold, thereby permitting the moulds to be kept in more constant use and effecting a saving in mould equipment.

It will be apparent that when desired handles or anchoring devices may be molded integrally and these, when desired, may be reinforced by including metal rods or wire fabric.

Having thus described our invention, what we claim is:

1. A container having a hard rubber impervious surface and a cellular hard rubber body integrally united with the walls of the cells intact.

2. A chemical apparatus having impervious chemical-contacting faces of hard rubber reinforced by an integral cellular backing of hard rubber composition.

3. A battery container having an interior lining of solid hard rubber and a supporting structure of cellular hard rubber vulcanized thereto.

4. A multiple-celled battery container having the cells formed of solid hard rubber, and a supporting structure of cellular hard rubber vulcanized thereto.

5. A multiple-celled battery container composed of solid hard rubber cells, and a cellular hard rubber structure completely surrounding the cells and vulcanized thereto.

6. A rigid structure having impervious hard rubber inner and outer walls and an intermediate layer of cellular hard rubber vulcanized thereto, with the walls of the cells intact and their interiors substantially void.

In testimony whereof we affix our signatures.

JOHN F. JOHNSTON.
GEORGE W. BULLEY.